United States Patent [19]

Takenaka et al.

[11] Patent Number: 5,381,499
[45] Date of Patent: Jan. 10, 1995

[54] LIGHT-EMITTING AND LIGHT-RECEIVING ASSEMBLY AND METHOD OF MANUFACTURE THEREOF

[75] Inventors: Naoki Takenaka; Yasushi Matsui, both of Neyagawa, Japan

[73] Assignee: Matsushita Electric Industrial Co., Ltd., Osaka, Japan

[21] Appl. No.: 87,209

[22] Filed: Jul. 2, 1993

[30] Foreign Application Priority Data

Oct. 6, 1992 [JP] Japan .................. 4-267132

[51] Int. Cl.[6] ............... G02B 6/00; G02B 6/36
[52] U.S. Cl. ........................ 385/93; 385/88
[58] Field of Search ................ 385/88, 92, 93

[56] References Cited

U.S. PATENT DOCUMENTS

| | | | |
|---|---|---|---|
| 4,707,067 | 11/1987 | Haberland et al. | 385/93 X |
| 5,074,682 | 12/1991 | Uno et al. | 385/93 |
| 5,127,074 | 6/1992 | Watanabe et al. | 385/93 |
| 5,222,170 | 6/1993 | Bargar et al. | 385/92 X |
| 5,239,605 | 8/1993 | Shimada | 385/92 X |

Primary Examiner—Akm E. Ullah
Attorney, Agent, or Firm—Rogers & Wells

[57] ABSTRACT

A light-emitting or light-receiving assembly is disclosed wherein the optical axis of input or output light to or from an optical fiber may not be shifted or dislocated under various environmental conditions. An optical isolator 3 is fixed on a lens mount 7 carrying a lens 2 and a ferrule 5 holding the optical fiber 12 therein is fixed to a ferrule holder 6 and the lens mount 7. Then, the distance between the lens 2 and an end surface 4 of the optical fiber is predetermined with a mechanical machining accuracy. This is followed by center-to-center adjustment through the use of a unit holder 8 placed around the lens mount 7. Thereafter, the lens mount 7 is fixedly secured to the unit holder 8 which in turn is fixedly secured to the laser mount 9, through the use of the YAG welding technique. An assembly unit 100 containing a semiconductor laser 1, the lens 2, the optical isolator 3 and the ferrule 4 is mounted on a temperature controlling Peltier effect element 10 by solder welding.

13 Claims, 2 Drawing Sheets

LIGHT-EMITTING AND LIGHT-RECEIVING ASSEMBLY AND METHOD OF MANUFACTURE THEREOF

BACKGROUND OF THE INVENTION

1. Field of the Invention

The present invention relates to a light-emitting and light-receiving assembly such as a semiconductor laser module or the like for use as a light source in optical communication and a method of manufacture thereof.

2. Description of the Related Prior Art

In the past years, semiconductor lasers for use as a light source in optical communication systems were designed into modules and optical fibers called "pigtail" used to convey laser light.

A conventional light-emitting assembly using a semiconductor laser as a light-emitting element is discussed with reference to FIG. 2 showing a cross sectional side view thereof. The light-emitting assembly in FIG. 2 includes a semiconductor laser 201, a lens 202, a light isolator 203, a package window 204, a core section 205 of an end surface of an optical fiber 212 for guiding light, a ferrule 206, a ferrule holder 207 and a package 208.

To construct the light-emitting assembly, a support 209 for the semiconductor laser 201 or "chip carrier" is mounted on a support 210 for the lens 202 or "lens mount." Then center-to-center adjustment is made in such a manner as to efficiently concentrate output light from the semiconductor laser 201 on the core section 205 of the end surface of the optical fiber. By the YAG welding technique, the ferrule 206 is fixed on the ferrule holder 207, which in turn is finally secured in the package window 204.

Within the above described optical system consisting of the single lens 202, the number of apertures or "NA" of the output light from the semiconductor laser 201 is usually within a range from 0.4 to 0.6; the NA of the output light from the optical fiber 212 is 0.1. It is therefore necessary to convert different NAs, because the single and common lens 202 must collect the output light from the semiconductor laser 201; it must also focus the laser light onto the end surface of the optical fiber 212 within the optical system consisting of only the single lens 202.

The optical system assumes a magnifying factor m as defined by equation (1) where $L_1$ is the distance between the lens 202 and the semiconductor laser 201 and $L_2$ is the distance between the lens 202 and the end surface of the optical fiber 212.

$$m = L_1/L_2 \tag{1}$$

As a result, the distance between the lens 202 and the end surface of the optical fiber 212 becomes longer than that of an optical system using a pair of lenses. Since the refractive index of optical components in the optical isolator 203 between the lens 202 and the optical fiber 212 is larger than that of air, the distance between the lens 202 and the end surface or optical fiber 212 is longer by a length of optical path corresponding to the difference in reflective index. Consequently, the semiconductor laser 201 and the end surface of the optical fiber 212 are usually secured and fixed on separate supports. Due to the difference in the thermal characteristics of support materials and thermal stress developed during the working and fixing of those supports, the optical axis of input laser light to the end surface of the optical fiber 212 may be shifted or dislocated under various environments during the actual use thereof.

As a solution to the above discussed problem, the improvement of a light-emitting assembly was proposed at the Third Optoelectronics Conference (OEC '90) Technical Digest, July 990, pp 216-217.

FIG. 3 is a cross sectional side view of the proposed light-emitting assembly. In FIG. 3, the light-emitting assembly includes a semiconductor laser 301, a lens 302, an optical isolator 303, a core section 305 of an optical fiber 312 for light transmission, a ferrule 306, a ferrule holder 307, a Peltier effect element 311 and a rod lens 313.

To complete the light-emitting assembly, a support for a spherical lens 302 or "can" is fixed on a support for the semiconductor laser 301 or "stem" and then the optical isolator 303 is fixed in such a manner as to minimize the insertion loss of the optical isolator 303 when the semiconductor laser 301 is driven. The rod lens 313 is attached to maximize the coupling efficiency and center-to-center adjustment is made to efficiently concentrate laser light on the core section 305 of the end surface of the optical fiber. The ferrule 306 is fixed in the ferrule holder 307 by the YAG welding technique and then the ferrule holder 307 is mounted on the optical isolator 303. Finally, the resulting unit is solder fixed onto a temperature-controlling Peltier effect element.

With the above described light-emitting assembly, center-to-center adjustment is made out to maximize output light from the spherical lens 302 with the semiconductor laser 301 in driven state, prior to the fixing of the can for the spherical lens 302 to the stem for the semiconductor laser 301. Such center adjustment may be accomplished only in a direction normal to the optical axis of the assembly and not in the direction of the optical axis, with difficulty in maximizing the coupling efficiency.

Therefore, the conventional light-emitting assemblies experience problems as follows. The semiconductor laser 201 and the end surface of the optical fiber 212 are generally secured on separate supports so that the optical axis of laser light incident on the end surface of the optical fiber 212 may be shifted or dislocated under various environments during the actual use due to the difference in thermal characteristics of the support materials and thermal stress internally developed in the support materials during the machining or fixing procedure thereof. The chip carrier for the semiconductor laser 201 is placed on the lens mount 210 for the lens 202 and thereafter the optical fiber 212 is adjusted into exact alignment with the focal point of focusing light from the lens 202. The positioning accuracy requirement when the chip carrier 209 is placed on the lens mount 210 is, however, increased m times in the direction of the optical axis and $m^2$ times in a direction normal to the optical axis. Therefore, deviations of the center position adjustment are substantial and adjustment of this sort is time consuming. The inner diameter of the package window 204 should be large enough to accommodate such substantial deviations, impeding downsizing of the package.

SUMMARY OF THE INVENTION

Accordingly, it is an object of the present invention to provide an optical assembly which overcomes one or more of the problems with the prior art assemblies.

It is still another object of the present invention to provide an optical assembly wherein the optical axis of input or output light to or from an optical fiber may be prevented from shifting and center-to-center adjustment may be made with a minimum of deviation in position for a shorter period of time so that downsizing of the assembly as a whole may be achieved readily.

According to the present invention, there is provided an optical assembly for optically coupling an electrooptic element (for example, a light-emitting semiconductor element or a light-receiving semiconductor element or light-emitting/receiving element) with an end portion of an optical fiber through a lens. An adjustment mechanism for center-to-center alignment between the electrooptic element and the end portion of the optical fiber includes a first support for supporting the lens and the end portion of the optical fiber at a desired distance, a second support for supporting the first support movable in the direction of light traveling between the electrooptic element and the end portion of the optical fiber, and a third support for supporting the electrooptic element, wherein the distance between the end portion of the optical fiber and the electrooptic element is adjustable to a desired distance in the direction of the light between the electrooptic element and the end portion of the optical fiber by the movable first support.

An assembly unit comprising the first, second and third supports, the end portion of the optical fiber, the lens and the electrooptic element is mounted on a common temperature controlling element such as a Peltier effect element.

In a first aspect of the present invention, there is provided a light emitting assembly which comprises a first support for supporting a ferrule carrying an optical fiber therein and a lens, a second support secured outside the first support for holding the first support movably with respect to the second support, and a third support for supporting a light-emitting element, the first support being movable with respect to the second support to set the distance between the optical fiber on the first support and the light emitting element on the third support at a desired one, wherein the first, second and third supports are mounted on a temperature-controlling Peltier effect element as a unit for optically coupling the light emitting element and the optical fiber via the lens.

In a second aspect of the present invention, there is provided a light receiving assembly which comprises a first support for supporting a ferrule carrying an optical fiber therein and a lens, a second support secured outside the first support for holding the first support movably with respect to the second support, and a third support for supporting a light-receiving element, the first support being movable with respect to the second support to set the distance between the optical fiber on the first support and the light receiving element on the third support at a desired one, wherein the first, second and third supports are mounted on a temperature-controlling Peltier effect element as a unit for optically coupling the light receiving element and the optical fiber via the lens.

In a third aspect of the present invention, there is provided a method of manufacturing a light emitting assembly which comprises the step of providing a first support for supporting a ferrule carrying an optical fiber therein and a lens, the step of placing a second support outside the first support for holding the first support movably with respect to the second support, the step of providing a third support for supporting a light-emitting element, the step of moving the first support with respect to the second support to set the distance between the optical fiber on the first support and the light emitting element on the third support at a desired one, the step of fixing the first support to the second support, the step fixing the second support to the third support, and the step of mounting the first, second and third supports on a temperature-controlling Peltier effect element as a unit for optically coupling the light emitting element and the optical fiber via the lens.

In a fourth aspect of the present invention, there is provided a method of manufacturing a light receiving assembly which comprises the step of providing a first support for supporting a ferrule carrying an optical fiber therein and a lens, the step of placing a second support outside the first support for holding the first support movably with respect to the second support, the step of providing a third support for supporting a light-receiving element, the step of moving the first support with respect to the second support to set the distance between the optical fiber on the first support and the light receiving element on the third support at a desired one, the step of fixing the first support to the second support, the step of fixing the second support to the third support, and the step of mounting the first, second and third supports on a temperature-controlling Peltier effect element as a unit for optically coupling the light receiving element and the optical fiber via the lens.

Pursuant to the teachings of the present invention, an optical assembly comprises a first support for supporting a ferrule carrying an optical fiber therein and a lens, a second support secured outside the first support for holding the first support movably with respect to the second support, and a third support for supporting a light-emitting or light-receiving element, the first support being movable with respect to the second support to set the distance between the optical fiber on the first support and the light emitting or light receiving element on the third support at a desired one. The first, second and third supports are mounted on a temperature-controlling Peltier effect element as a unit for optically coupling the light emitting or light receiving element and the optical fiber via the lens. With the above arrangement, the unit is kept constant even under application of thermal stress or the like to prevent the shifting or dislocating of the optical axis of input or output light at the optical fiber and assure stable operation of the optical assembly under various or varying environments.

After the distance between the lens and the optical fiber is set and fixed, the distance between the optical fiber and the light emitting or light receiving element on the third support is adjusted and determined by moving the first support with respect to the second support. This lessens the positioning accuracy requirement for positioning the light emitting or light receiving element on the third support, unlike the prior art assemblies wherein the positioning accuracy requirement of the light emitting or light receiving element was increased m times in the direction of the optical axis and $m^2$ times in a direction normal to the optical axis. Therefore, the optical assembly of the present invention suffers no or less deviation in the adjusted center position and does not require much time for center-to-center adjustment, with resulting cost reduction. There is no need for a larger inner size of the package window for wider adjustment, with resulting downsizing of the assembly.

Additional features of the present invention are described in relation to the description of preferred embodiments of the present invention.

DETAILED DESCRIPTION OF PREFERRED EMBODIMENTS OF THE INVENTION

Figure 1:
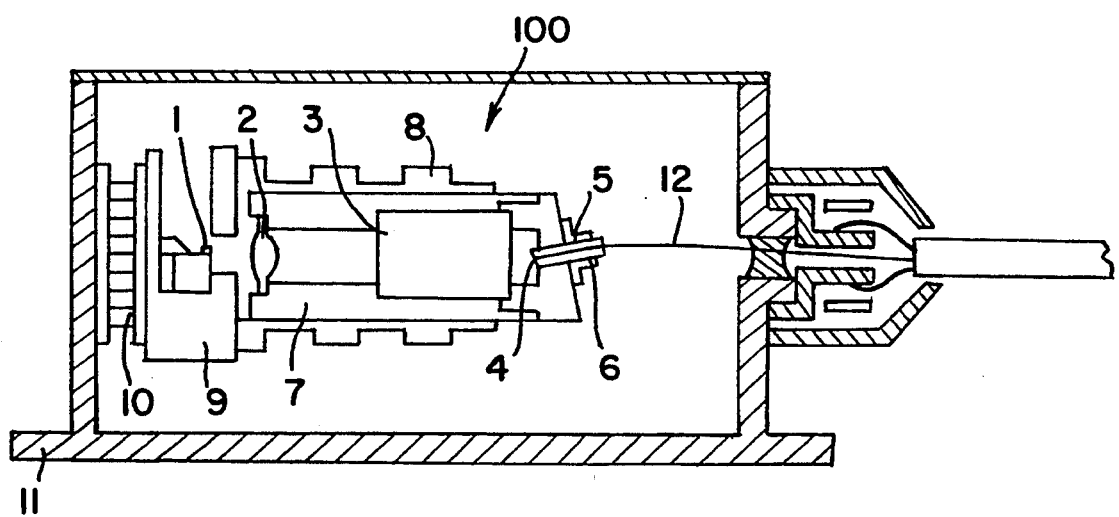
FIG. 1 is a cross sectional side view of a light emitting assembly according to an embodiment of the present invention.
Figure 2:
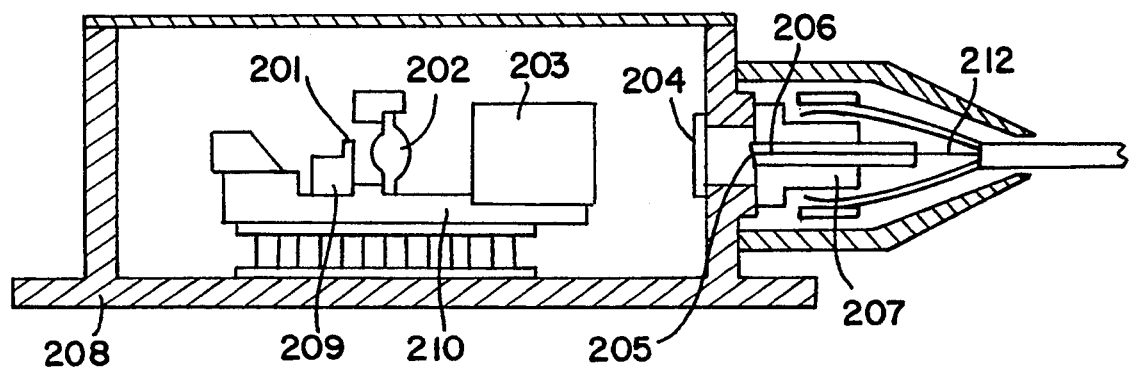
FIG. 2 is a cross sectional side view of a prior art light emitting assembly.
Figure 3:
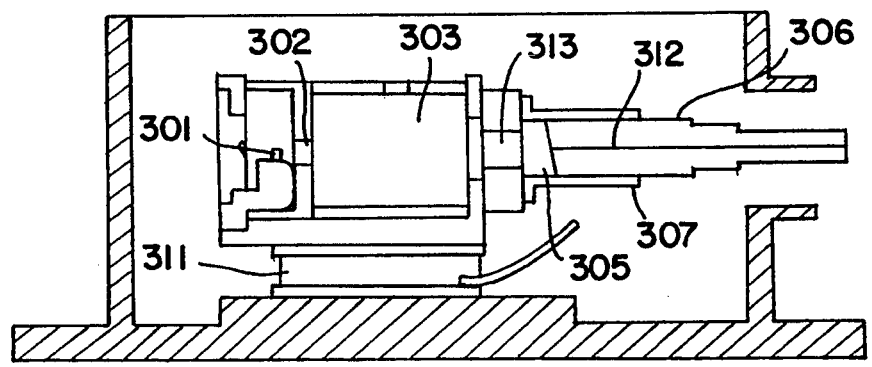
FIG. 3 is a cross sectional side view of a prior art light emitting assembly as disclosed in the OEC '90 Technical Digest, 1990 July, pp 216–217.

An preferred embodiment of the present invention will be described referring to the drawings. FIG. 1 is a cross sectional side view showing the structure of a light emitting assembly according to an embodiment of the present invention. The light emitting assembly of FIG. 1 includes a semiconductor laser serving as a light emitting element, a lens 2, an optical isolator 3, an end surface 4 of an optical fiber, a ferrule 5, a ferrule holder 6, a lens mount (first support) 7, a unit holder (second support) 8, a laser mount (third support) 9, a Peltier effect element 10, a package 11, the optical fiber 12 and an optical assembly unit 100.

As is seen in FIG. 1, the optical isolator 3 is secured in the lens mount 7 carrying the lens 2 and the ferrule 5 carrying the optical fiber 12 therein is secured on the lens mount 7 through the use of the ferrule holder 6. These components are assembled into an integrated unit with machining accuracy and the distance between the lens 2 and the end surface 4 of the optical fiber is determined and fixed at this time. Then, the unit holder 8 is secured around the unit. Through the use of the unit holder 8, center-to-center adjustment is made to concentrate laser light emitting from the semiconductor laser 1 on the laser mount 9 efficiently on a core section (quartz glass area for light transmission) at the end surface 4 of the optical fiber. Thereafter, the lens mount 7 is fixed to the unit holder 8 and the laser mount 9 is fixed to the unit holder 8 by using the YAG welding technique, so that the semiconductor laser 1, the lens 2, the optical isolator 3 and the ferrule 4 are assembled and integrated into the optical assembly unit 100. The optical assembly unit 100 is solder fixed and mounted on the temperature-controlling Peltier effect element 10 secured inside the package 11. Finally, the optical fiber 12 with a metallic coating is solder fixed at intermediate portion thereof to the package. It is noted that the Peltier effect element 10 is mounted on the package 11 in a direction parallel with the optical axis of the laser light between the semiconductor laser 1 and the end surface 4 of the optical fiber in such a manner not to prevent movement of the lens mount 7 (first support), unlike the conventional optical assembly wherein the Peltier effect element is mounted in a direction normal to the optical axis of the laser light.

In the above illustrated embodiment, the semiconductor laser 1, the lens 2, the optical isolator 3 and the ferrule 4 of the optical assembly unit 100 are supported on the separate supports including the lens mount 7 and the laser mount 9. In spite of the difference in their thermal characteristics developing internally in the respective supports, the whole assembly unit 100 may be maintained at a constant temperature (room temperature) by fixing the assembly unit 100 on the common Peltier effect element 10. Accordingly, even if the Peltier effect element 10 or the package 11 becomes distorted due to the difference in the thermal characteristics of the materials of the Peltier effect element 10 and the package 11 or thermal stress or the like internally developed therein during machining or assembling of the optical assembly, stable operation is assumed under various environments because the whole unit 100 is maintained at a constant temperature and there is no possibility that the optical axis of laser light entering the end surface 4 of the optical fiber may be shifted or dislocated.

After the distance between the lens 2 and the end surface 4 of the optical fiber is fixed, center adjustment is effected to maximize the output laser light from the semiconductor laser 1 at the end surface of the optical fiber and to determine the optimum distance between the semiconductor laser 1 and the lens 2. This leads to a lessening of the positioning accuracy requirement for positioning the semiconductor laser 1 on the laser mount 9, unlike the prior art assemblies wherein the positioning accuracy requirement of the light emitting or light receiving element was increased m times in the direction of the optical axis, and $m^2$ times in a direction normal to the optical axis. Therefore, the optical assembly of the present invention reduces deviation in the adjusted center position and requires much less time for center-to-center adjustment, with resulting cost reduction. There is no need for a larger inner size of the package window for wider adjustment, to allow downsizing of the assembly.

Although in the above illustrated embodiment the light emitting assembly utilizes the semiconductor laser 1 as the light emitting element, the light emitting element should not be limited to the semiconductor laser 1 but include other forms of light emitting element. The present invention applies equal to a light emitting assembly where there is provided a second lens in a path between the optical isolator 3 and the end surface 4 of the optical fiber in the optical system.

Furthermore, it is obvious to those skilled in the art that the present invention is applicable equally to a light receiving assembly wherein laser light is applied to a remote end of the optical fiber 12 opposite the end surface 4 and delivered from the end surface 4 and the semiconductor laser 1 is replaced by a light receiving or light responsible element.

While preferred embodiments have been described, various modifications and substitutions may be made without departing from the spirit and scope of the invention. Accordingly, it is understood that the present invention has been described by way of illustration and not limitation.

What is claimed is:

1. A single-lens optical assembly comprising:
   (a) an electrooptic element;
   (b) an optical fiber to be optically aligned with said electrooptic element along an optical axis of the single-lens optical assembly, the optical fiber having an end portion;
   (c) a single and separate lens for optically coupling the electrooptic element with the end portion of the optical fiber along the optical axis of the single-lens optical assembly;
   (d) a first support for supporting the single and separate lens and the end of the optical fiber in a predetermined spaced relationship;

(e) a second support for supporting the first support for movement of the lens and the end portion of the optical fiber supported on the first support along the optical axis of the single-lens optical assembly;
(f) a third support for supporting the electrooptic element; and
(g) means for effecting center adjustment between the electrooptic element and the end portion of the optical fiber and maximizing the coupling efficiency between the electrooptic element and the end portion of the optical fiber by moving the first support together with the end portion of the optical fiber and the lens, with respect to the second support, to adjust the distance between the end portion of the optical fiber and the electrooptic element.

2. A single-lens optical assembly as set forth in claim 1 wherein said electrooptic element is a semiconductor light emitting laser.

3. A single-lens optical assembly as set forth in claim 2 wherein said electrooptic element is a semiconductor light responsive element.

4. A single-lens optical assembly comprising:
(a) an electrooptic element;
(b) an optical fiber to be optically aligned with said electrooptic element along an optical axis of the single-lens optical assembly, the optical fiber having an end portion;
(c) a single and separate lens for optically coupling the electrooptic element with the end portion of the optical fiber along the optical axis of the single-lens optical assembly;
(d) a lens mount for supporting the single and separate lens and the end portion of the optical fiber in a predetermined spaced relationship;
(e) means for supporting the lens mount movably along the optical axis of the single-lens optical assembly;
(f) an electrooptic element mount for supporting the electrooptic element;
(g) means for effecting center adjustment between the electrooptic element and the end portion of the optical fiber and maximizing the coupling efficiency between the electrooptic element and the end portion of the optical fiber by moving the lens mount together with the end portion of the optical fiber and the lens, with respect to the second support, to adjust the distance between the end portion of the optical fiber and the electrooptic element; and
(h) a temperature controlling element for maintaining at a constant temperature an assembly unit comprising the lens mount, the electrooptic element mount, the optical fiber, the lens and the electrooptic element.

5. A single-lens light-emitting assembly comprising:
(a) a light-emitting element;
(b) an optical fiber to be optically aligned with the light-emitting element along an optical axis of the single-lens light-emitting assembly, the optical fiber having a ferrule for holding an end portion thereof;
(c) a single and separate lens for optically coupling the light-emitting element with the end portion of the optical fiber along the optical axis of the single-lens optical assembly;
(d) a first support for supporting the single and separate lens and the end of the optical fiber in the ferrule in a predetermined spaced relationship;
(e) a second support for supporting the first support for movement of the lens and the end portion of the optical fiber supported on the first support along the optical axis of the single-lens optical assembly;
(f) a third support for supporting the light-emitting element; and
(g) means for effecting center adjustment between the light-emitting element and the end portion of the optical fiber and maximizing the coupling efficiency between the light-emitting element and the end portion of the optical fiber by moving the first support together with the end portion of the optical fiber and the lens, with respect to the second support, to adjust the distance between the end portion of the optical fiber and the light-emitting element.

6. A single-lens light-receiving assembly comprising:
(a) a light-receiving element;
(b) an optical fiber to be optically aligned with the light-receiving element along an optical axis of the single-lens light-receiving assembly, the optical fiber having a ferrule for holding an end portion thereof;
(c) a single and separate lens for optically coupling the light-receiving element with the end portion of the optical fiber along the optical axis of the single-lens optical assembly;
(d) a first support for supporting the single and separate lens and the end of the optical fiber in the ferrule in a predetermined spaced relationship;
(e) a second support for supporting the first support for movement of the lens and the end portion of the optical fiber supported on the first support along the optical axis of the single-lens optical assembly;
(f) a third support for supporting the light-receiving element; and
(g) means for effecting center adjustment between the light-receiving element and the end portion of the optical fiber and maximizing the coupling efficiency between the light-receiving element and the end portion of the optical fiber by moving the first support together with the end portion of the optical fiber and the lens, with respect to the second support, to adjust the distance between the end portion of the optical fiber and the light-receiving element.

7. An optical assembly comprising:
(a) a housing having two side walls;
(b) an electrooptic element to be secured within the housing;
(c) an optical fiber held in one of the two side walls of the housing, the optical fiber having an end portion to be optically aligned with said electrooptic element along an optical axis of the optical assembly;
(d) a single and separate lens for optically coupling the electrooptic element with the end portion of the optical fiber along the optical axis of the single-lens optical assembly;
(e) a lens mount for supporting the single and separate lens at a one end portion of the lens mount and a ferrule at another end portion of the lens mount to enclose the end portion of the optical fiber, the lens and the ferrule being maintained on the lens mount in a predetermined spaced relationship;
(f) means for supporting the lens mount movably along the optical axis of the optical assembly between the two side walls of the housing;

(g) an electrooptic element mount for supporting the electrooptic element;

(h) means for effecting center adjustment between the electrooptic element and the end portion of the optical fiber enclosed in the ferrule and maximizing the coupling efficiency between the electrooptic element and the end portion of the optical fiber by moving the lens mount together with the end portion of the optical fiber and the lens, with respect to the second support, to adjust the distance between the end portion of the optical fiber and the electrooptic element; and (i) a temperature controlling element secured on the other side wall of the housing in a direction parallel with the optical axis of the optical assembly in such a manner not to interfere with the movement of the lens mount along the optical axis, the temperature controlling element serving to maintain at a constant temperature an assembly unit comprising the lens mount, the electrooptic element mount, the optical fiber, the lens and the electrooptic element.

8. A method of manufacturing a single-lens light-emitting assembly comprising:

(a) providing a light-emitting element;

(b) providing an optical fiber to be optically aligned with the light-emitting element along an optical axis of the single-lens optical assembly, the optical fiber having an end portion;

(c) providing a single and separate lens for optically coupling the light-emitting element with the end portion of the optical fiber along the optical axis of the single-lens optical assembly;

(d) providing a first support for supporting the single and separate lens and the end of the optical fiber in a predetermined spaced relationship;

(e) placing a second support outside the first support for supporting the first support for movement of the lens and the end portion of the optical fiber supported on the first support along the optical axis of the single-lens optical assembly;

(f) providing a third support for supporting the light-emitting element; and (g) moving the first support with respect to the second support to set the distance between the optical fiber on the first support and the light-emitting element on the third support at such a value to maximize coupling efficiency between the light-emitting element and the end portion of the optical fiber;

(h) fixing the first support to the second support;

(i) fixing the second support to the third support; and (j) mounting the first, second and third supports on a temperature-controlling Peltier effect element as a unit for optically coupling the light-emitting element and the optical fiber via the single lens.

9. A method of manufacturing a single-lens light emitting assembly as set forth in claim 8 wherein the fixing of the first and second supports to the second and third supports is effected by the welding technique.

10. A method of manufacturing a single-lens light-receiving assembly comprising:

(a) providing a light-receiving element;

(b) providing an optical fiber to be optically aligned with the light-receiving element along an optical axis of the single-lens optical assembly, the optical fiber having an end portion;

(c) providing a single and separate lens for optically coupling the light-receiving element with the end portion of the optical fiber along the optical axis of the single-lens optical assembly;

(d) providing a first support for supporting the single and separate lens and the end of the optical fiber in a predetermined spaced relationship;

(e) placing a second support outside the first support for supporting the first support for movement of the lens and the end portion of the optical fiber supported on the first support along the optical axis of the single-lens optical assembly;

(f) providing a third support for supporting the light-receiving element; and (g) moving the first support with respect to the second support to set the distance between the optical fiber on the first support and the light-receiving element on the third support at such a value to maximize coupling efficiency between the light-receiving element and the end portion of the optical fiber;

(h) fixing the first support to the second support;

(i) fixing the second support to the third support; and (j) mounting the first, second and third supports on a temperature-controlling Peltier effect element as a unit for optically coupling the light-receiving element and the optical fiber via the single lens.

11. A method of manufacturing a single-lens light emitting assembly as set forth in claim 10 wherein the fixing of the first and second supports to the second and third supports is effected by the welding technique.

12. A single-lens optical assembly comprising:

(a) an electrooptic element;

(b) an optical fiber to be optically aligned with said electrooptic element along an optical axis of the single-lens optical assembly, the optical fiber having an end portion;

(c) a single and separate lens for optically coupling the electrooptic element with the end portion of the optical fiber along the optical axis of the single-lens optical assembly;

(d) a lens mount for supporting the single and separate lens and the end of the optical fiber in a predetermined spaced relationship;

(e) an electrooptic element mount for supporting the electrooptic element; and (f) an adjustment mechanism for adjusting the distance between the optical fiber and the electrooptic element along the optical axis of the single-lens optical assembly to maximize optical coupling between the electrooptic element and the end portion of the optical fiber by varying the relative position between the end portion of the optical fiber and the single lens.

13. A single-lens optical assembly as set forth in claim 12 further comprising:

(a) a temperature controlling element for maintaining at a constant temperature an assembly unit comprising the lens mount, the electrooptic element mount, the optical fiber, the lens and the electrooptic element, the temperature controlling element being mounted in a direction not to prevent varying of the relative position relationship between the optical fiber and the electrooptic element.

* * * * *